F. J. SEYMOUR,

Assignor to himself and Phelps, Dodge & Co.

FLOOR-PROTECTOR FOR STOVES.

No. 7,758. Reissued June 19, 1877.

Witnesses.

Chas. H. Smith

William G. Mott

Inventor

Frederick J. Seymour per Lemuel W. Serrell atty.

N. PETERS, PHOTO-LITHOGRAPHER, WASHINGTON, D. C.

UNITED STATES PATENT OFFICE.

FREDERICK J. SEYMOUR, OF WOLCOTTVILLE, CONNECTICUT, ASSIGNOR TO HIMSELF AND PHELPS, DODGE & CO.

IMPROVEMENT IN FLOOR-PROTECTORS FOR STOVES.

Specification forming part of Letters Patent No. 183,711, dated October 24, 1876; reissue No. 7,758, dated June 19, 1877; application filed June 7, 1877.

*To all whom it may concern:*

Be it known that I, FREDERICK J. SEYMOUR, of Wolcottville, in the State of Connecticut, have invented an Improvement in Floor-Protectors for Stoves, of which the following is a specification:

Sheet-metal plates have been used beneath stoves to protect the floor from the heat and dust of the stove, and these are sometimes called "stove-boards."

My improvement relates to a means for stiffening and strengthening the rim of the sheet of metal, so that it renders the plate more rigid than heretofore, and it allows for the rim being ornamented by embossing. The sheet of metal is cut out round, oval, or polygonal—preferably the former. The edges are stiffened by the sheet metal of the plate folded.

Figure 1:
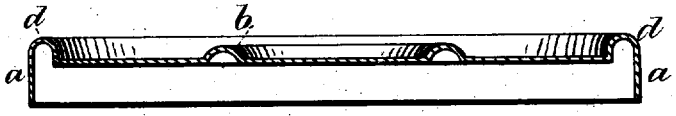

The edges are shown stamped up into a cylindrical flange, as seen at *a* in Figure 1, and the surface of the sheet is ornamented and stiffened by one or more concentric ribs, *b d*, the rib *d* being at the junction of the flange *a* and plate.

Figure 2:
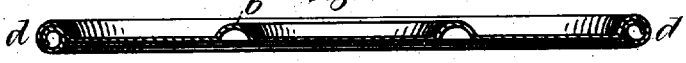

The sheet metal of the edge of the cylindrical flange is now turned inward to complete the rib *d*, with the metal double, there being two or more thicknesses in the rib around the edge, as seen in Fig. 2.

The sheet metal, being folded or rolled up, serves to strengthen the outer rib by forming a support between the under surface of the rib and the floor out of the metal of the plate itself, while in the ribs heretofore employed there is no support beneath the highest portion of the rib; therefore the same is liable to be indented in use. By my device the expense of a wire to fill the rib is avoided, the support to the rib being derived from the sheet metal of the plate only.

Figure 5:
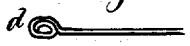

This manner of making the rib insures great strength and stiffness in the sheet metal around the edges, and said rib may be ornamented with any desired embossed figure upon the upper surface, which consolidates the metal and causes the rib to assume about the form shown in Fig. 5.

Figure 3:
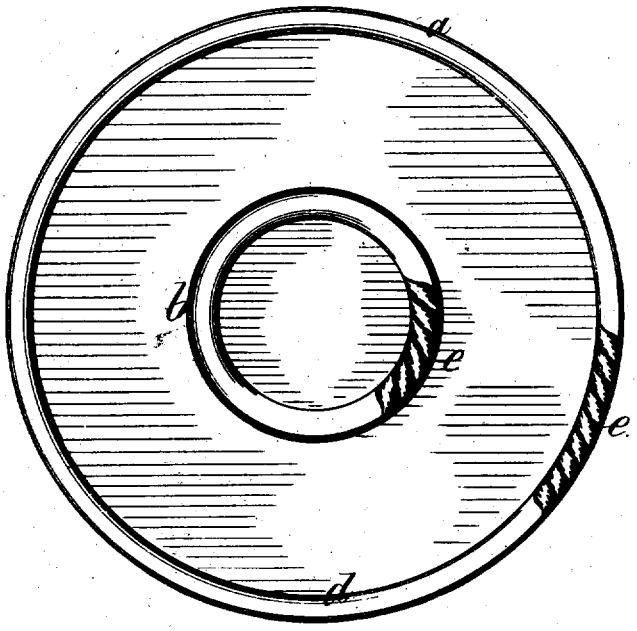

Fig. 3 is a plan view of the finished stove-board. Portions of the ribs *b d* are represented as embossed at *e*.

Figure 4:
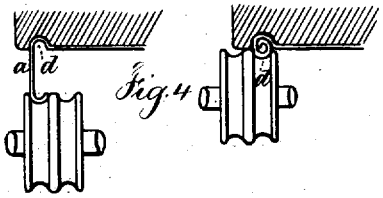

The double sheet-metal rib might be rolled or bent up by dies; but I prefer to mount the circular plate upon a revolving face-plate, and apply to the edge of the cylindrical flange a grooved roller, as illustrated in Fig. 4, said roller serving to bend over the edge of the plate and roll it into the form of the double rib, as shown.

I claim as my invention—

1. The sheet-metal rib for the edge of a floor-protector, strengthened by the edge of the sheet metal, which is folded beneath the rib, and extends from the under side of the rib to the floor, substantially as set forth.

2. The floor-protector for stoves, having a rib around the edge of the sheet metal, double in the top part and outer edge of the rib, and embossed, substantially as set forth.

Signed by me this 23d day of May, A. D. 1877.

F. J. SEYMOUR.

Witnesses:
H. C. SPENCER,
WM. ALLING.